(12) United States Patent
Witteveen

(10) Patent No.: US 10,064,419 B2
(45) Date of Patent: Sep. 4, 2018

(54) METHOD OF FORMING FLAVOR COATED PARTICLES

(75) Inventor: Frans Witteveen, CM Leusden (NL)

(73) Assignee: Givaudan SA, Vernier (CH)

( * ) Notice: Subject to any disclaimer, the term of this patent is extended or adjusted under 35 U.S.C. 154(b) by 130 days.

(21) Appl. No.: 14/112,443

(22) PCT Filed: Apr. 27, 2012

(86) PCT No.: PCT/EP2012/057711
§ 371 (c)(1),
(2), (4) Date: Nov. 15, 2013

(87) PCT Pub. No.: WO2012/150182
PCT Pub. Date: Nov. 8, 2012

(65) Prior Publication Data
US 2014/0127360 A1    May 8, 2014

(30) Foreign Application Priority Data
May 3, 2011   (GB) .................................. 1107221.2

(51) Int. Cl.
A23L 5/00     (2016.01)
A23L 1/22     (2006.01)
A23L 27/00    (2016.01)

(52) U.S. Cl.
CPC .......... A23L 1/22008 (2013.01); A23L 27/70 (2016.08)

(58) Field of Classification Search
None
See application file for complete search history.

(56) References Cited

U.S. PATENT DOCUMENTS

| | | | |
|---|---|---|---|
| 4,207,355 A * | 6/1980 | Chiu et al. | 426/578 |
| 4,460,617 A * | 7/1984 | Barndt et al. | 426/609 |
| 4,576,737 A | 3/1986 | Johnson | |
| 4,615,892 A * | 10/1986 | Morehouse et al. | 426/250 |
| 5,028,447 A * | 7/1991 | Schenk | 426/605 |
| 2006/0165990 A1* | 7/2006 | Curtis | A23L 1/0029 428/402.2 |
| 2008/0015264 A1 | 1/2008 | Schleifenbaum et al. | |
| 2009/0317521 A1* | 12/2009 | Campanile | A23F 3/40 426/93 |
| 2010/0086612 A1* | 4/2010 | Frambol | A21D 2/02 424/490 |

FOREIGN PATENT DOCUMENTS

| | | | |
|---|---|---|---|
| EP | 0 070 719 A1 | 1/1983 | |
| EP | 0426428 A1 * | 10/1991 | A23G 4/20 |
| GB | 1 426 106 A | 2/1976 | |
| GB | 1 535 470 | 12/1978 | |
| WO | WO 91/17821 | * 11/1999 | |

OTHER PUBLICATIONS http://www.udel.edu/FREC/ilvento/FREC408/tables.pdf, pp. 1-5, Feb. 19, 2016.*
Chemistry Department, University of North Carolina Chapel Hill; https://www.shodor.org/unchem/math/r_p/, pp. 1-3, 2008.*
PCT/EP2012/057711—International Search Report, dated Jul. 25, 2012.
PCT/EP2012/057711—International Written Opinion, dated Jul. 25, 2012.
PCT/EP2012/057711—International Preliminary Report on Patentability, dated Nov. 5, 2013.

* cited by examiner

*Primary Examiner* — Tamra L. Dicus
(74) *Attorney, Agent, or Firm* — Curatolo Sidoti Co., LPA; Joseph G. Curatolo; Salvatore A. Sidoti

(57) ABSTRACT

A method of forming flavor particles comprising spraying an emulsion of a flavor material in an aqueous coating material with a core material in a heated environment at a drying temperature, the core material being a finely-divided native starch having a gelatinization temperature higher than that of the drying temperature. The process allows much quicker and more efficient processing.

5 Claims, No Drawings

METHOD OF FORMING FLAVOR COATED PARTICLES

CROSS REFERENCE TO RELATED APPLICATIONS

This application is a national stage application of International Application No. PCT/EP2012/057711, filed 27 Apr. 2012, which claims priority from Great Britain Patent Application No. 1107221.2, filed 3 May 2011, from which applications priority is claimed, and which are incorporated herein by reference.

This description relates to a method of preparation of flavour particles.

Flavour-containing particles are widely used in the preparation of comestible products. They are particularly preferred when long-term or slow release of flavour is desired. A typical flavour-containing particle comprises a core on to which is applied a flavour composition, typically an emulsion of a flavour material in a film-forming composition. There may then be applied one or more further coatings, which may be designed to retain the flavour in the particle until release is needed. The particles are typically formed using fluidised bed or spray drying techniques, in which the particle coating is formed, either by spraying the emulsion with the core material into a heated chamber, or on to suspended core material in a heated fluidised bed. In either case, the temperature should be sufficient to dry the particles.

Materials for use as core materials must naturally be able to be consumed. A favourite material for cores has been gelatin, because of its edibility, its ready availability and its cheapness. However, the use of gelatine can introduce problems into the process. At the temperatures required for the formation of solid particles (typically 40°-85° C.), the gelatin particles are inherently sticky, as is the resultant coated material. This results in a tendency to stick to vessel walls. This brings a double disadvantage. First of all, in order to counter this tendency, the spray rate must be reduced. Secondly, the product stuck to the vessel walls can be recovered, but this recovery and the resultant grinding necessary means more lost time and wasted energy.

It has now been found that it is possible to overcome this problem by using a new method. There is therefore provided a method of forming flavour particles comprising spraying an emulsion of a flavour material in an aqueous coating material with a core material in a heated environment at a drying temperature, the core material being a finely-divided native starch having a gelatinisation temperature higher than that of the drying temperature.

There is also provided a flavour particle comprising an unflavoured core and a flavoured coating, preparable by a process as hereinabove described.

By "native starch" is meant a starch that does not form a paste with water at a temperature lower than its gelatinization temperature, and is therefore at most sparingly soluble in water.

Typical examples of suitable native starches include starches derived from maize, sorghum, rice, tapioca, sago and pea, particular examples being rice grit and tapioca grit. Typical useful commercial grades are Beneo Remyflo™ R 500-TT (rice) and Tapiocaline™ CR521 (tapioca).

By "finely-divided" is meant having a particle size distribution of 80-750 micron. In a particular embodiment, at least 90% of the material should lie within the range 200-250 micron.

By "gelatinisation temperature" is meant the temperature at which the native starch begins to transition from a hard substance to a soft one with a sticky surface. The gelatinisation temperature is 65° C. minimum, and particularly at least 68° C. Thus, certain common native starches, such as wheat and potato, are excluded because of their relatively low gelatinisation temperatures.

In the process hereinabove described, a drying temperature between 40°-85° C. is possible, particularly from 65°-70° C. By using native starches, the abovementioned process can be carried out without the major stickiness problems encountered when gelatin is used.

In the practice of the abovementioned process, the emulsion and the particulate native starch are sprayed together. The relative proportions can vary between wide limits, depending on use and desired end result, but typically the weight proportion of the dried emulsion to native starch will vary between 5% and 20%, particularly between 8% and 12%.

The spraying may be carried out using standard equipment in the normal manner known to the art. It is a feature of this process that the losses of flavour emulsion by its sticking to surfaces are considerably reduced, making the whole process both cheaper and quicker. In addition, it may be performed at a temperature below that of the known processes, thus further reducing energy costs.

The resulting particulate flavours are solid, non-adhesive particles, which can be used in consumable compositions.

The process is now further described with reference to the following non-limiting examples.

EXAMPLES

Experiments as described below were carried out in a fluidised bed utilising identical process parameters for both examples. The equipment used was a GPCG01 (Glatt AG)

| Example No. | Core Material | Drying Temperature ° C. | Air volume M3/h | Pump emulsion speed (units) |
|---|---|---|---|---|
| 1 | Gelatin Bloom 250 | 65-71 | 72-77 | 15-35 |
| 2 | Rice flour Coarse 500 | 64-72 | 68-73 | 15-55 |

In Example 1, a particulate flavouring composition was prepared from the ingredients shown in the following table:

| | |
|---|---|
| Gelatin 250 bloom, | 589 g. |
| Water | 1750 g. |
| Menthol | 150 g. |

This blend was sprayed along with 83 g. of 250 bloom gelatin. Because of the stickiness of the gelatin core, the spraying rate had to be reduced and the processing time was 165 minutes.

The Example 2 composition was identical to that of Example 1, but replacing the gelatin with the same quantity of rice flour coarse 500 (Beneo Remyflo R 500-TT)

It was noticeable that the process performed with rice flour resulted in a product that was less sticky. This allowed a shorter process time—135 minutes, as opposed to the 165 minutes achieved with the gelatine, an 18% reduction.

The invention claimed is:

1. A method of forming flavour particles comprising a core material, flavour material and an aqueous coating material, the method comprising:
step (a) of preparing a flavour emulsion of the flavour material in the aqueous coating material, and
step (b) of spraying the flavour emulsion of step (a) with the core material in a heated environment at a drying temperature, the core material being a finely-divided native starch having a gelatinisation temperature higher than that of the drying temperature, which core material is gelatin-free.

2. The method according to claim 1, in which the native starch has a gelatinisation temperature of at least 65° C.

3. The method according to claim 1, in which the native starch is selected from those derived from maize, sorghum, rice, tapioca, sago and peas.

4. The method according to claim 1, wherein the weight proportion of emulsion to native starch in the flavor particle is from 1:20 to 1:5.

5. The method according to claim 1, wherein the weight proportion of emulsion to native starch in the flavor particle is from 1:12.5 to 1:8.3.

* * * * *